No. 781,536. PATENTED JAN. 31, 1905.
O. LÖFFLER & W. WEIDLE.
FILTER.
APPLICATION FILED JAN. 25, 1904.
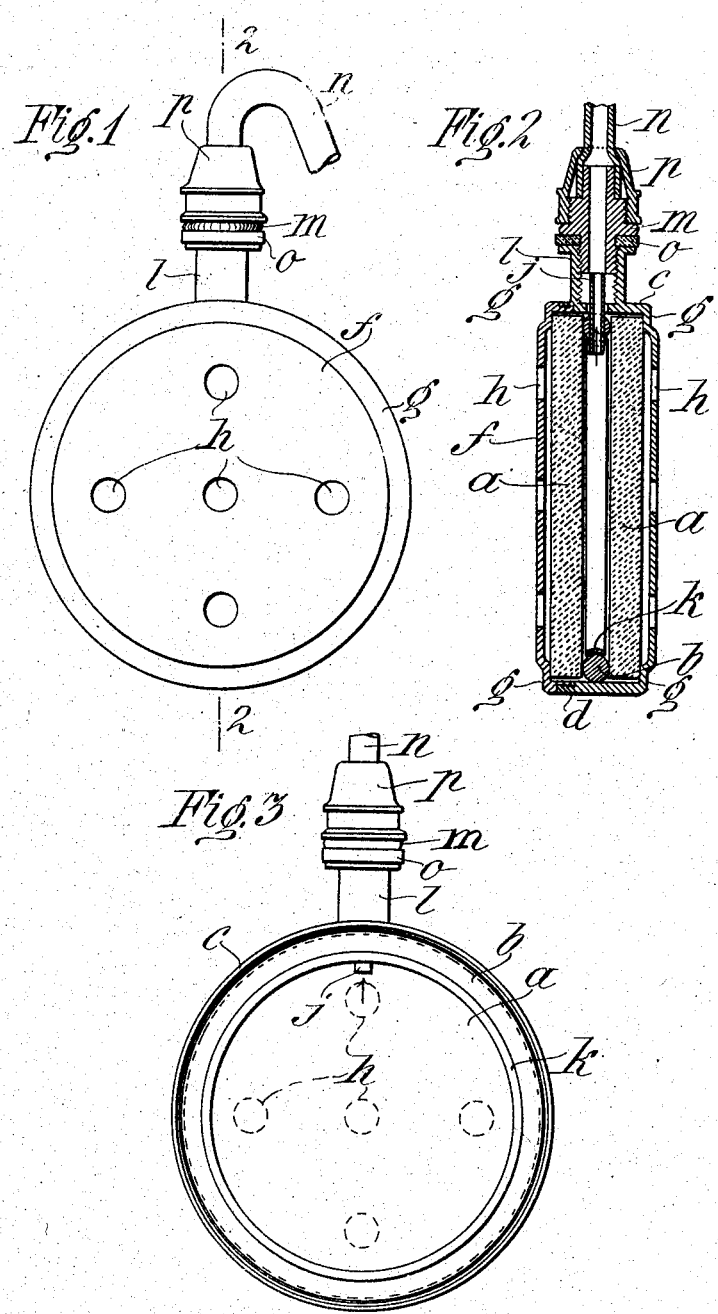
Witnesses
H M Kuehne
John A. Percival
Inventors
Oswald Löffler
Wilhelm Weidle
By Richards
Attorneys No. 781,536. Patented January 31, 1905.

UNITED STATES PATENT OFFICE.

OSWALD LÖFFLER AND WILHELM WEIDLE, OF VIENNA, AUSTRIA-HUNGARY.

FILTER.

SPECIFICATION forming part of Letters Patent No. 781,536, dated January 31, 1905.

Application filed January 25, 1904. Serial No. 190,586.

*To all whom it may concern:*

Be it known that we, OSWALD LÖFFLER, of 81 Währingergürtel, and WILHELM WEIDLE, of 25 Alleegasse, Vienna, in the Province of Lower Austria and Empire of Austria-Hungary, subjects of the Emperor of Austria-Hungary, have invented certain new and useful Improvements in Filters, of which the following is a specification.

This invention relates to improvements in filters in which the liquid to be filtered is sucked through filtering-bodies; and the object of the invention is to provide a filter of this kind the action of which will be perfectly uniform and which is so constructed that the cleaning, sterilizing, and renewing of all its parts can be easily effected.

The filtering-chamber of the improved filter is formed by two plates, disks, or the like of filtering material, between which is arranged a washer, packing-ring, or the like provided with an aperture for a tube connected to the suction-pipe. The said plates or disks are pressed firmly against the washer by means of frames connected to each other in a suitable manner. These frames can, if desired, be so constructed as to form a casing for the filter, with spaces for the entrance of liquid between its perforated walls and the outer surface of the filtering-plates.

For pocket use the filter can be provided with a flat cylindrical casing, circular filtering-disks, a screw-threaded cover, and a packing-ring placed round a metal ring, by which it is pressed against the cylindrical walls of the casing. Both the packing-ring and the metal ring are in this case provided with apertures for a small tube leading to the space between the filtering-disks.

One form of the filter for pocket use is illustrated in the annexed drawings, in which—

Figure 1 is a front view; Fig. 2, a vertical cross-section on the line 2 2 of Fig. 1, and Fig. 3 a front view of the filter with the cover and one filter-plate removed.

The filtering-chamber is in this case formed by the two disks $a$, of filtering material, and the packing-ring $b$, of india-rubber or the like, placed between the said disks. The disks $a$ and ring are arranged in a flat cylindrical case $c$, the cylindrical wall of which is screw-threaded at $d$ for the reception of a screw-threaded cover $f$. The screwing together of the cover and case causes the disks $a$ to be pressed firmly against the ring $b$. The central parts of the cover and casing surrounded by the flat borders $g$ are provided with apertures $h$ and project outwardly, so that between them and the filtering-disks spaces are formed into which the liquid to be filtered can enter through the apertures $h$. These perforated central parts serve to protect the filtering-plates from injury; but they can be dispensed with, if desired, in which case the filtering-chamber is supported by the cylindrical walls of the casing and the borders or flanges $g$ alone. Through the packing-ring $b$ the tube $j$ for the filtered liquid extends into the interior of the filtering-chamber. This tube is fixed to a grooved metal ring $k$, which bears against the inner surface of the packing-ring $b$ and presses the latter against the cylindrical wall of the casing, which is provided with a screw-threaded socket or the like $l$ for the reception of the screw-threaded nozzle $m$ of the rubber tube $n$. Between the socket $l$ and the flange of the nozzle $m$ a packing-ring $o$ is inserted to render the joint tight.

The filter can, of course, be of other than circular shape, and, if desired, a number of filters can be connected to each other in parallel and operated by means of a suction-pump.

The construction of the improved filter allows of taking it to pieces and reassembling it with ease for the purpose of cleaning or exchanging the parts. The uniform access of liquid to the filter-plates from outside and the uniform thickness of the filtering material at all parts renders the filtration perfectly uniform.

Having now described my invention, what I claim, and desire to secure by Letters Patent of the United States, is—

1. A suction-filter comprising in combination two plates of filtering material, a packing arranged between the said plates and forming with them the filtering-chamber, means for pressing the said plates against the packing and a tube passing through the said packing and connected with a suction-pipe, substantially as described and for the purpose specified.

2. A suction-filter comprising in combination two plates of filtering material, a packing arranged between the said plates and forming with them the filtering-chamber, a tube passing through the said packing and connected with a suction-pipe, a casing consisting of two parts surrounding the two plates and the packing and connected together by suitable means, the walls opposite the filtering-plates being so shaped, that spaces are left between them and the said plates, and perforations in said walls, substantially as described and for the purposes specified.

3. A suction-filter specially adapted for pocket use, comprising two circular filtering-plates, a packing-ring arranged between said plates, a cylindrical box for the reception of the filter-plates and the packing-ring, a metal ring pressing the packing-ring against the cylindrical wall of the casing, an outflow-tube secured to said ring and passing through the packing, an outflow-socket on the casing, a suction-tube secured to said socket and a cylindrical cover screwed to the casing and openings in the cover and bottom of the casing, substantially as described and for the purpose set forth.

In witness whereof we have hereunto set our hands in presence of two witnesses.

OSWALD LÖFFLER.
WILHELM WEIDLE.

Witnesses:
GUSTAV PAPPENHEIM,
MAX HAUSSEN.